United States Patent
Mizes et al.

(10) Patent No.: US 12,520,102 B2
(45) Date of Patent: Jan. 6, 2026

(54) SYSTEMS AND METHODS FOR PROBABILISTIC POINT OF INTEREST VISIT COUNT ESTIMATION

(71) Applicant: Verizon Patent and Licensing Inc., Basking Ridge, NJ (US)

(72) Inventors: Howard Mizes, Salem, SC (US); Daniel Jacob Abreu, San Jose, CA (US); Kaiss K. Alahmady, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 440 days.

(21) Appl. No.: 18/145,955

(22) Filed: Dec. 23, 2022

(65) Prior Publication Data

US 2024/0214769 A1    Jun. 27, 2024

(51) Int. Cl.
*H04W 4/021* (2018.01)
*G06F 17/18* (2006.01)

(52) U.S. Cl.
CPC .......... *H04W 4/021* (2013.01); *G06F 17/18* (2013.01)

(58) Field of Classification Search
CPC ..... H04W 4/021; H04W 4/022; H04W 4/023; H04W 4/025; H04W 4/029; G06F 7/18
USPC ...................................................... 455/456.1
See application file for complete search history.

(56) References Cited

U.S. PATENT DOCUMENTS

| | | | |
|---|---|---|---|
| 2012/0011137 A1* | 1/2012 | Sheha | H04L 67/52 707/E17.014 |
| 2013/0252633 A1* | 9/2013 | Liang | H04W 52/0251 455/456.1 |
| 2015/0106011 A1* | 4/2015 | Nesbitt | G01C 21/3484 701/417 |
| 2016/0189186 A1* | 6/2016 | Fabrikant | G06Q 30/0205 705/7.34 |
| 2017/0339235 A1* | 11/2017 | Chin | H04W 4/029 |
| 2018/0014161 A1* | 1/2018 | Warren | G06F 16/24578 |
| 2018/0112996 A1* | 4/2018 | Montell | G01C 21/3682 |
| 2020/0142914 A1* | 5/2020 | Hui | G06F 16/248 |
| 2020/0211053 A1* | 7/2020 | Shishkin | G06N 20/00 |
| 2021/0209645 A1* | 7/2021 | Shishkin | H04W 4/029 |

* cited by examiner

*Primary Examiner* — Jean A Gelin

(57) ABSTRACT

In some implementations, a device may obtain location data associated with one or more user devices, wherein the location data indicates, for the one or more user devices, respective geographic locations and respective durations. The device may determine, based on the location data, one or more point of interest (POI) locations associated with respective user devices from the one or more user devices. The device may determine, for each user device from the one or more user devices, probability values for respective POI locations from the one or more POI locations, wherein the probability values indicate likelihoods of user visits at the respective POI locations. The device may determine one or more probability metrics for the respective POI locations, from the one or more POI locations, associated with user visits to the respective POI locations. The device may store the one or more probability metrics.

20 Claims, 8 Drawing Sheets

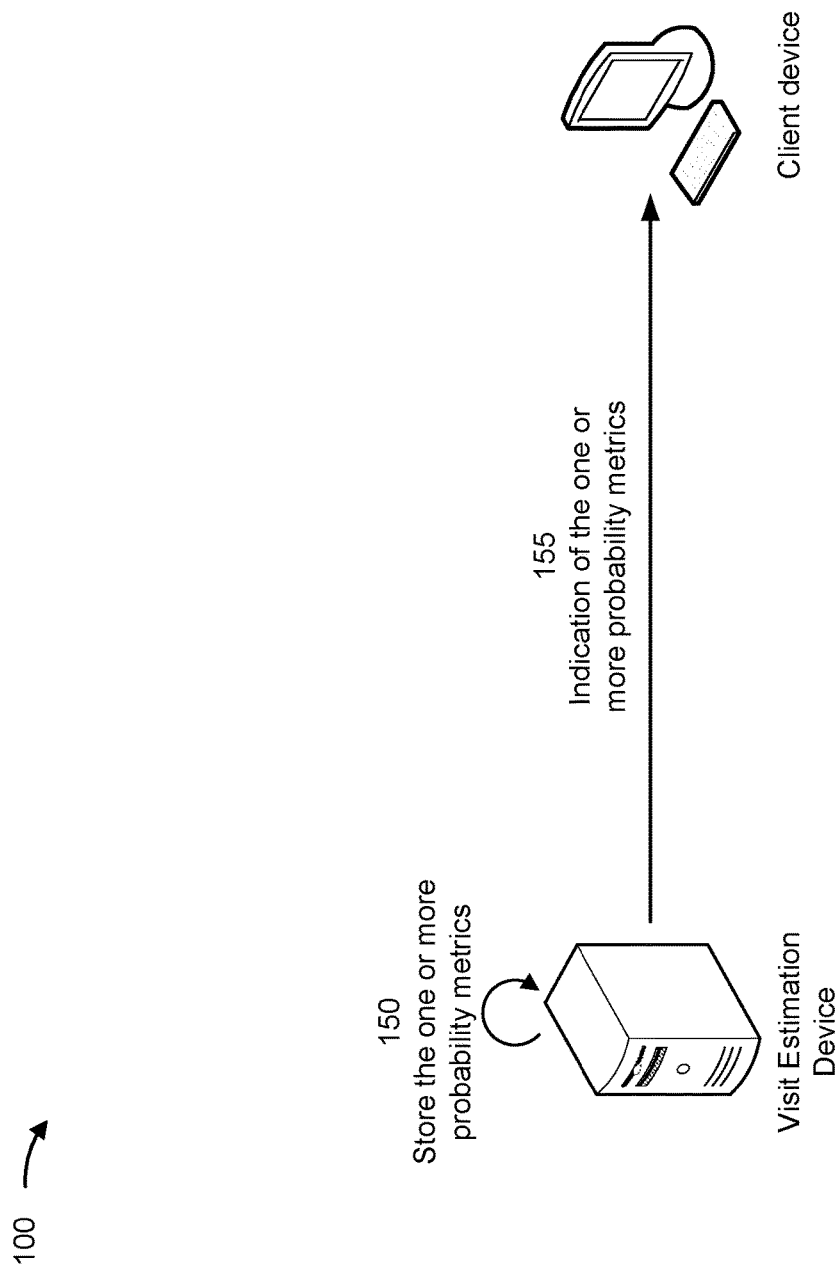

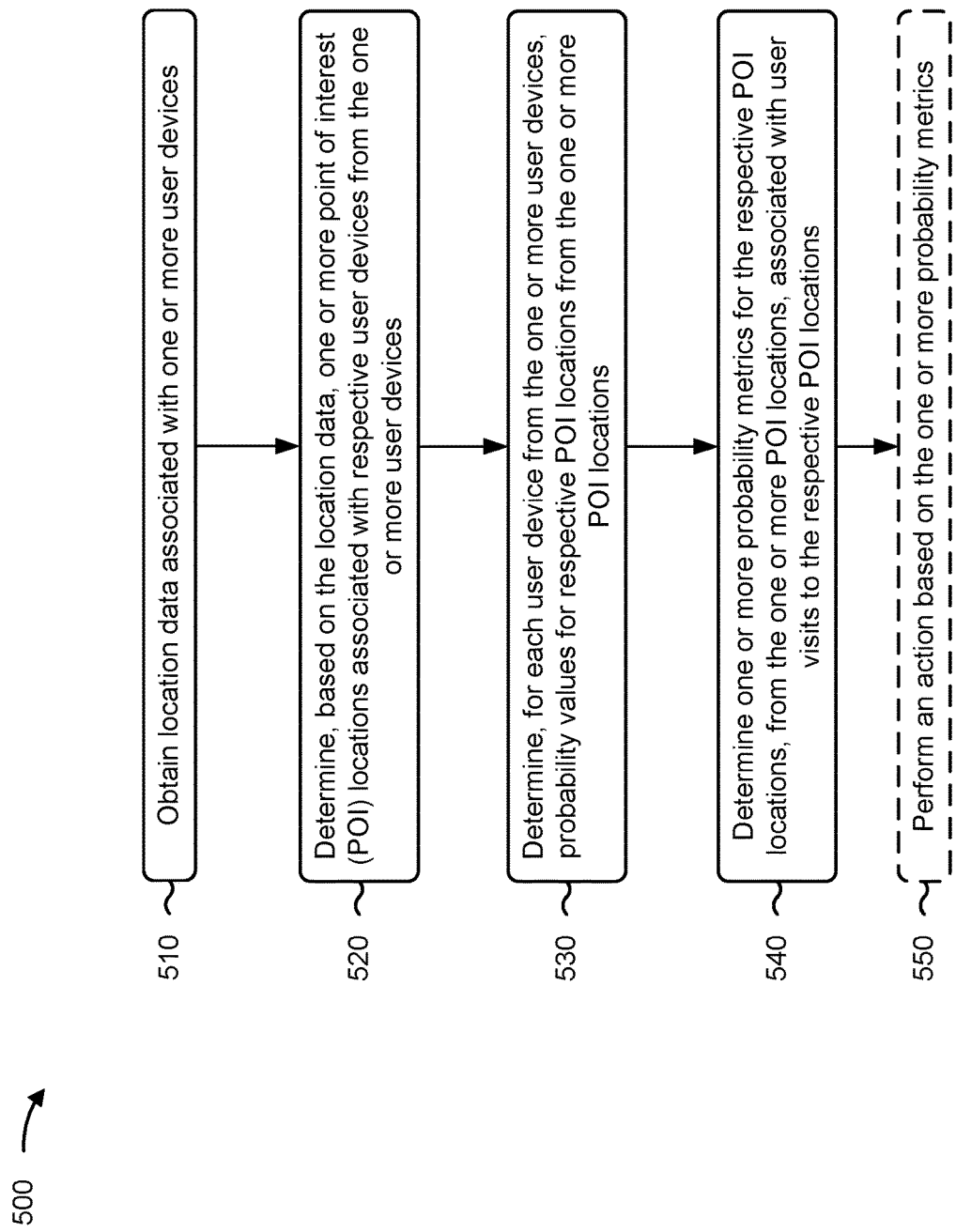

SYSTEMS AND METHODS FOR PROBABILISTIC POINT OF INTEREST VISIT COUNT ESTIMATION

BACKGROUND

User device tracking is a process for identifying the location of a user device (e.g., a mobile phone), whether stationary or moving. A multi-lateration of radio signals between one or more base stations (e.g., cell towers) of a network may be used to determine a position of a user device. In other words, a position of a user device may be determined using a network infrastructure of a service provider. For example, one or more base stations may monitor for a signal transmitted by a user device and determine which base station is best positioned to communicate with the user device. As the user device changes location, the base stations may monitor the signal from the user device, and the phone is handed over to an adjacent base station as appropriate. By comparing one or more communication parameters associated with one or more base stations, a general location of a user device can be roughly determined. This may be referred to as cell tower triangulation. User device tracking may be used for location-based services that disclose the actual coordinates of a user device and/or for identifying point of interest (POI) locations at which the user device is located.

BRIEF DESCRIPTION OF THE DRAWINGS

FIGS. 1A-1D are diagrams of an example associated with probabilistic point of interest (POI) visit count estimation.

FIG. 5 is a flowchart of an example process associated with probabilistic POI visit count estimation.

DETAILED DESCRIPTION OF EXAMPLE EMBODIMENTS

Figure 1A:
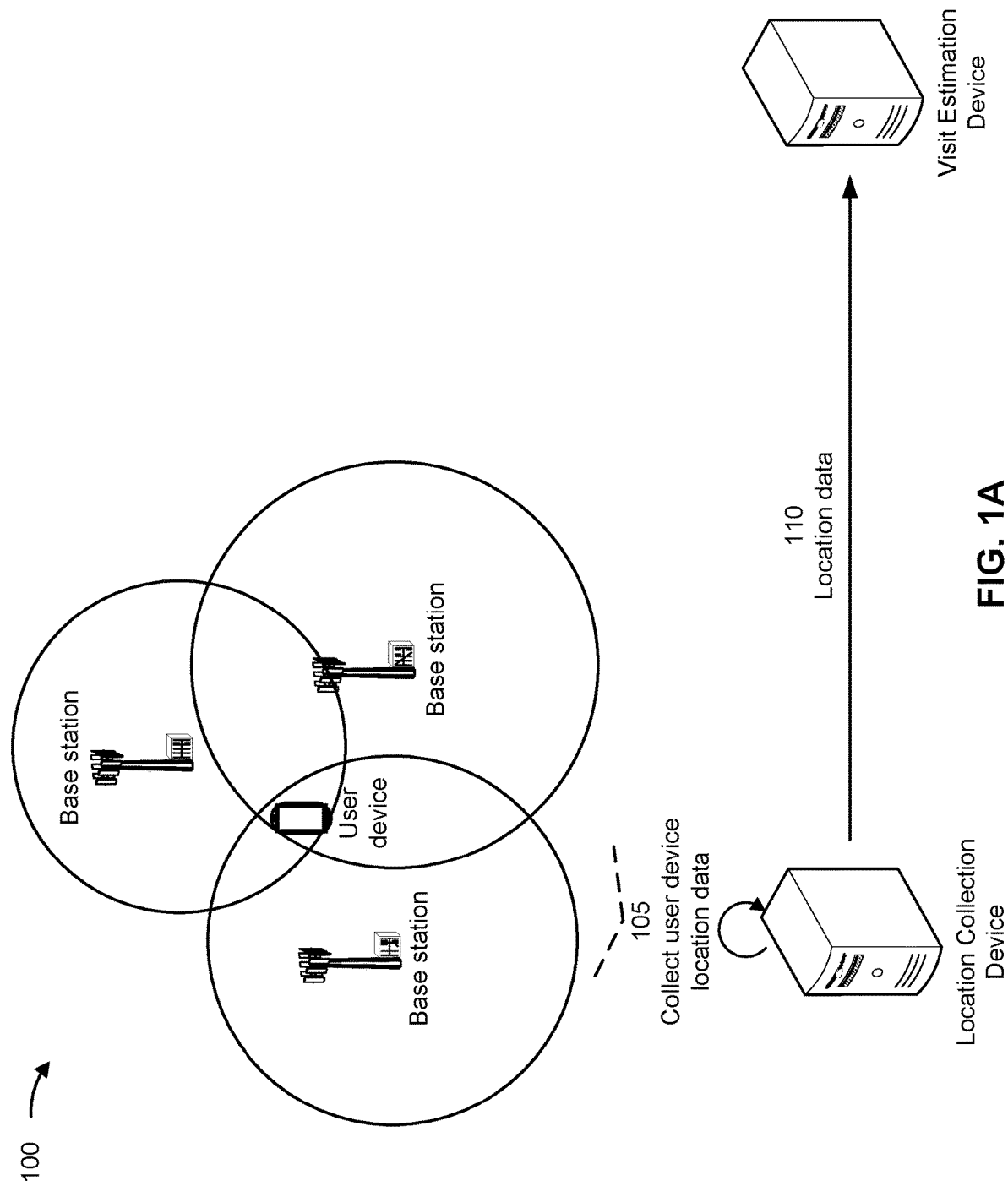

The following detailed description of example implementations refers to the accompanying drawings. The same reference numbers in different drawings may identify the same or similar elements.

In some cases, a system may determine a location of a user device (e.g., a mobile phone). For example, the system may use triangulation data (e.g., cell tower triangulation data) to determine the location of the user device. For example, user devices may communicate with a core network of a wireless network via a network of transmitters and receivers on cell phone towers (e.g., base stations) and other locations that have a wide geographic coverage. The system may use one or more communication parameters associated with communications between a user device and one or more base stations to determine a location of the user device. The one or more communication parameters may include a timing advance, a reference signal received power, a reference signal received quality, a received signal strength indicator, and/or a cell orientation, among other examples. The system may determine one or more position tracks associated with the user device. For example, a position track may include a sequential series in time of geographic coordinates and/or a duration of time at a given geographic coordinate.

In some examples, the system may assign a point of interest (POI) location associated with the location of the user device. A POI location may include a geographical region or area where a user may visit for some duration of time. For example, a POI location may include a store, a business, a building, an arena, a stadium, a park, a public transportation stop (e.g., a train station, a bus stop, and/or a subway station), a parking area (e.g., a parking lot and/or a parking garage), and/or an airport, among other examples. A geographical area may include a polygon (e.g., a shape on a map that is defined by a set of individual latitude and longitude coordinates) or a multi-polygon (e.g., a collection of polygons). The system may obtain an indication of geographic areas (e.g., geographic footprints) associated with respective POI locations. Additionally, the system may identify a geographic coordinate location associated with a user device and an uncertainty associated with a user device location. A general form of an uncertainty may consist of a polygon surrounding the best estimate (e.g., an estimated geographic coordinate position) of a user device location. The uncertainty may be estimated by a confidence radius (e.g., a radius around the geographic coordinate location in which a likelihood that the user device is located within the area defined by the geographic coordinate location and the confidence radius is high). The system may determine that the user device has a nonzero probability of being located at the POI location if the user uncertainty polygon intersects the POI polygon. When the uncertainty is estimated by a confidence radius, a score can be assigned based on an overlap between the geographic footprint of the POI location and an area associated with the user device location (e.g., defined by the geographic coordinate location of the user device and the confidence radius).

In some cases, a location of the user device (e.g., as indicated by triangulation data) may be associated with multiple possible POI locations. In such examples, a POI location may be selected from the multiple possible POI locations based on one or more criteria. For example, the POI location that is selected from the multiple possible POI locations may be associated with a greatest area of overlap with the user device location (e.g., defined by the geographic coordinate location of the user device and the confidence radius). However, selecting a POI location in this manner may result in an inaccurate determination that the user device (e.g., and a user associated with the user device) visited the selected POI location.

For example, a POI location with a large footprint will often be selected as the POI location associated with the user device over a nearby POI location with a small footprint because of the large area of overlap between the user device location and the larger POI footprint. Additionally, because the system may determine visit counts based on the selected POI location (e.g., in a binary or "all-or-nothing" manner), visit counts determined by the system associated with respective POI locations may be inaccurate. In other words, determining or selecting a POI location associated with a user device location (e.g., when the user device location is associated with an uncertainty range in which the user device may be located) in the manner described above may result in a bias toward POI locations having a large geographic footprint (e.g., when the POI locations are located near other POI locations with smaller geographic footprints). This may consume network resources, processing resources, computing resources, and/or memory resources, among other examples, associated with analyzing and/or making determinations based on visit count data that is inaccurate (e.g., because of a bias toward POI locations with larger geographic footprints).

Some implementations described herein enable probabilistic POI visit count estimation. For example, a system may obtain location data associated with one or more user devices. For example, the location data may be based on triangulation data associated with the one or more user devices (e.g., obtained via a network infrastructure of a service provider associated with the one or more user devices, as described in more detail elsewhere herein). The system may determine one or more POI locations associated with respective user devices from the one or more user devices. For example, the system may determine one or more POI locations that have a geographic footprint that overlaps with an uncertainty range of a location of a user device. The uncertainty range may be a geographic area defined by a coordinate location of the user device and a radius around the coordinate location, where a value of the radius is based on an uncertainty of the determination of the coordinate location of the user device.

The system may determine probability values for respective POI locations from the one or more POI locations. A probability value may indicate a likelihood of a user visit at a given POI location (e.g., a likelihood that the user device is located at the given POI location). For example, for each potential POI location associated with a given user device location, the system may determine a probability value indicating a likelihood or probability that the user device is located at the POI location. The system may determine one or more probability metrics for the respective POI locations, from the one or more POI locations, associated with user visits to the respective POI locations.

For example, for each user device from the one or more user devices, the system may determine probability values and durations of visits for respective POI locations from one or more potential POI locations associated with the user device. The system may store the probability values and the durations in a table or other data structure. The system may determine, based on the probability values and the durations, the one or more probability metrics for respective POI locations from a set of POI locations indicated in the table or other data structure. The one or more probability metrics may include an estimated total visit count (e.g., based on probability values associated with a given POI location), an estimated total visit duration (e.g., based on the durations and the probability values associated with a given POI location), and/or a error metric (e.g., indicating a confidence level that the estimated total visit count and/or the estimated total visit duration are accurate), among other examples.

As a result, the system is enabled to improve an accuracy of visit count estimations for POI locations that are based on location data of user devices. For example, by using a probabilistic approach to estimating visit counts at POI locations, the system mitigates a risk of bias toward POI locations that are associated with larger geographic footprints than nearby POI locations. The system also removes a risk of assigning zero visit counts to small footprint POI locations that are adjacent to larger footprint POI locations. This conserves network resources, processing resources, computing resources, and/or memory resources, among other examples, that would have otherwise been used analyzing and/or making determinations based on visit count data that is inaccurate (e.g., because of a bias toward POI locations with larger geographic footprints and against POI locations with smaller geographic footprints).

FIGS. 1A-1D are diagrams of an example 100 associated with probabilistic POI visit count estimation. As shown in FIGS. 1A-1D, example 100 includes a location collection device, a visit estimation device, and a client device. These devices are described in more detail in connection with FIGS. 3 and 4. For example, the visit estimation device may be the visit estimation device 310, the location collection device may be the location collection device 320, and the client device may be the client device 330 depicted and described in more detail in connection with FIG. 3.

As shown in FIG. 1A, a location of a user device may be determined based on communications with one or more base stations (e.g., cell towers) of a wireless network. For example, the wireless network may include a radio access network (RAN). The RAN may support, for example, a cellular radio access technology (RAT). The RAN may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for user devices. The RAN may transfer traffic between a user device (e.g., using a cellular RAT), one or more base stations (e.g., using a wireless interface or a backhaul interface, such as a wired backhaul interface), and/or a core network. The RAN may provide one or more cells that cover geographic areas. A user device may include a mobile phone (e.g., a smart phone or a radiotelephone), a user equipment (UE), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

For example, a user device may communicate with one or more base stations (e.g., three base stations are shown in FIG. 1A as an example). As shown by reference number 105, the location collection device may collect user device location data. The user device location data may also be referred to as triangulation data or cellular tower triangulation data. In some implementations, the user device location data may include one or more communication parameters associated with communications between the user device and the one or more base stations. For example, the one or more communication parameters may include a timing advance, a reference signal received power, a reference signal received quality, a received signal strength indicator, and/or a cell orientation, among other examples. In some implementations, a base station (or another network device, such as a core network device or a central unit (CU)) may determine a location of the user device (e.g., geographic coordinates associated with the user device) as well as an uncertainty in the measurement based on the one or more communication parameters. In such examples, the base station or other network device may transmit, and the location collection device may receive, an indication of the location of the user device. In other examples, the location collection device may determine a location of the user device (e.g., geographic coordinates associated with the user device) based on the one or more communication parameters. Locations of multiple user devices may be collected and/or determined in a similar manner.

In some implementations, a determined location of a user device (e.g., based on triangulation data) may be associated with an uncertainty range. The uncertainty range may be an area around a geographic coordinate in which a likelihood that the user device is included in the uncertainty range has a probability of being located that satisfies a threshold. For example, an uncertainty in a location of a user device can be represented by a circle with the user device's most likely position at the center of the circle, and the radius of the circle chosen so that the user device's true position is somewhere in the circle with a probability that satisfies the threshold. The uncertainty range for a given user device location may be defined by a geographic coordinate location associated with the user device (e.g., determined based on triangulation data associated with the user device) and the radius.

As shown by reference number 110, the location collection device may transmit or provide, and the visit estimation device may receive or obtain, location data. The location data may indicate locations (e.g., geographic coordinates) associated with respective user devices. For example, the location data may indicate a geographic coordinate location for one or more user devices. The visit estimation device may obtain the location data associated with the one or more user devices. The location data may indicate, for the one or more user devices, respective geographic locations and respective durations. For example, for a given user device, the location data may indicate a geographic coordinate location and a duration (e.g., an amount of time) that the user device was located at the geographic coordinate location.

In some implementations, the location collection device may periodically provide the location data to the visit estimation device. For example, the location collection device may provide the location data for locations collected over a given time frame, such as an hour, a day, a week, and/or a month, among other examples. As an example, the location collection device may provide the location data to the visit estimation device at an end of a day, indicating user device locations collected for the day.

Figure 1B:
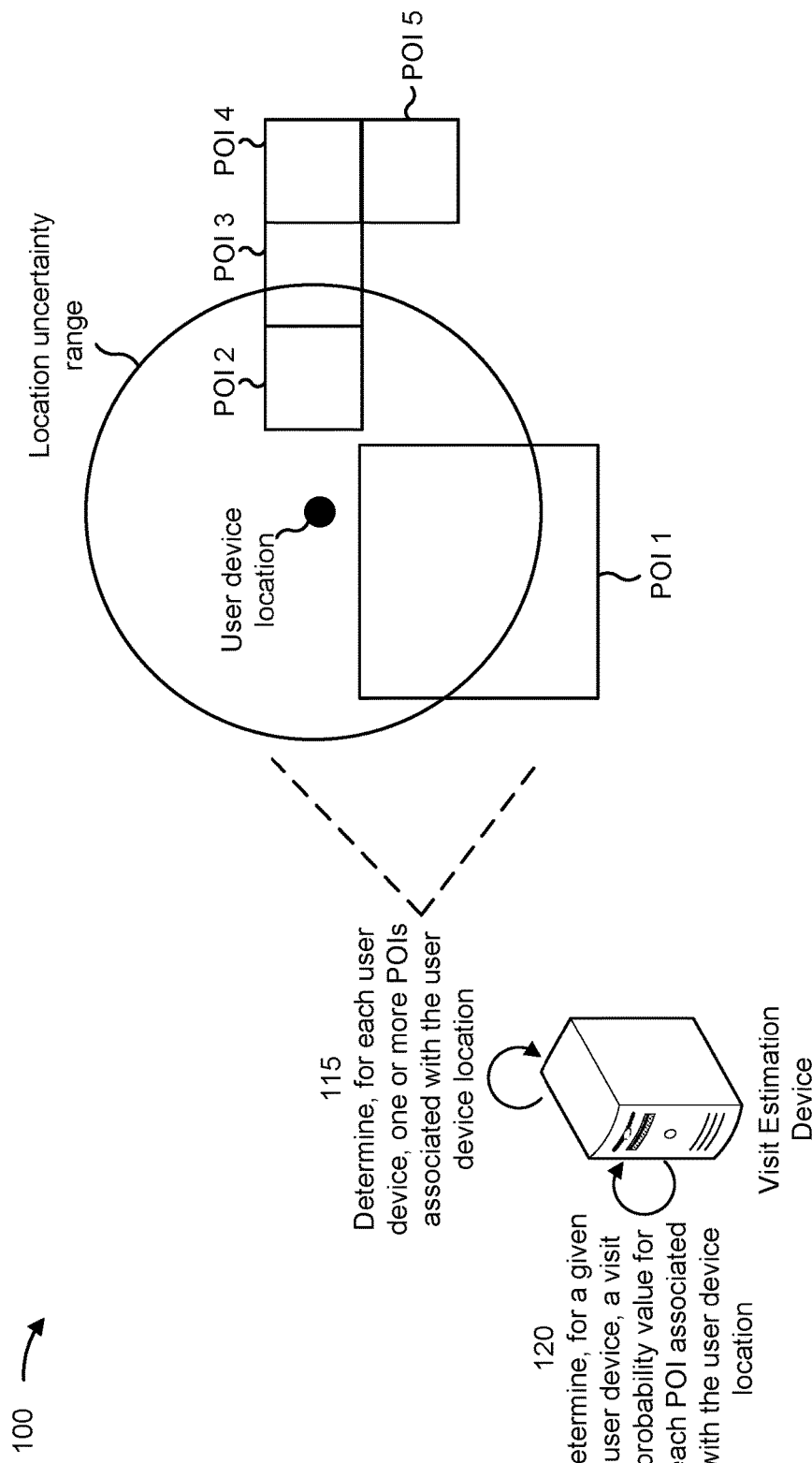

As shown in FIG. 1B, the visit estimation device may determine, for each user device indicated by the location data, whether a location of the user device is associated with a POI location. For example, the visit estimation device may store and/or access a database of POI locations (e.g., indicating geographic footprints of respective POI locations). The visit estimation device may determine, for each user device indicated by the location data, whether a location of the user device corresponds to a location (e.g., a geographic footprint) of one or more POI locations. For example, as shown by reference number 115, the visit estimation device may determine, for each user device indicated by the location data, one or more POI locations associated with respective user devices from the one or more user devices (e.g., indicated by the location data).

For example, as shown in FIG. 1B, a user device location may be associated with an uncertainty range, as described in more detail elsewhere herein. Additionally, the visit estimation device may identify a geographic footprint of one or more POI locations near the user device location (e.g., shown as POI 1, POI 2, POI 3, POI 4, and POI 5 in FIG. 1B). The visit estimation device may determine that a POI location is associated with the user device location based on a geographic footprint of the POI location overlapping with the uncertainty range associated with the user device location. As another example, the visit estimation device may determine that a POI location is associated with the user device location based on a distance between the geographic footprint (e.g., an outer bound of the geographic footprint or a center of the geographic footprint) of the POI location and the user device location satisfying a threshold.

For example, the visit estimation device may determine that the user device location is associated with POI 1, POI 2, and POI 3 (e.g., because the uncertainty range associated with the user device location overlaps with the geographic footprints of POI 1, POI 2, and POI 3). In some implementations, the visit estimation device may determine that the user device location is not associated with POI 4 and POI 5 because the uncertainty range associated with the user device location does not overlap with the geographic footprints of POI 4 and POI 5.

As shown by reference number 120, the visit estimation device may determine, for a given user device, a visit probability value (e.g., referred to herein as a probability value) for each POI location associated with the user device location. For example, the visit estimation device may determine probability values for respective POI locations from the one or more POI locations. A probability value may indicate a likelihood of a user visit at a given POI location. The probability value may be based on the uncertainty range associated with the geographic location of the user device (e.g., the user device location) and geographic footprints associated with the respective POI locations associated with the user device.

For example, for a POI location associated with the user device location, the visit estimation device may determine a visit score based on a geographic location associated with the user device (e.g., the user device location) and a geographic footprint associated with the POI location. The visit score may be based on an area of overlap between the uncertainty range associated with the user device location and the geographic footprint associated with the POI. For example, if the area of the overlap is larger, then the visit score may be larger. For the example depicted in FIG. 1B, the visit estimation device may determine a first visit score for POI 1, a second visit score for POI 2, and a third visit score for POI 3. For example, the first visit score may be greater than the second visit score and the third visit score because an area of the overlap between the user device uncertainty range and the geographic footprint of POI 1 is larger than the overlap between the user device uncertainty range and the geographic footprints of POI 1 and POI 2.

In some implementations, a visit score may be based on a location probability distribution over the uncertainty range associated with the geographic location and the geographic footprint. For example, a likelihood of a true location of the user device may not be equal in all areas of the uncertainty range. For example, the user device may have a greater likelihood of being located near the center of the uncertainty range and the likelihood may decrease moving toward the edge of the uncertainty range. Therefore, a first overlap (e.g., between the uncertainty range and a geographic footprint of a POI location) that is closer to the center of the uncertainty range may be associated with a greater visit score than a second overlap that is closer to the edge of the uncertainty range. The dependence of the true likely hood of user position can be captured with a probability distribution function (PDF). The integral between the probability distribution function that captures the user device location uncertainty and the geographic footprint of the POI location can be used as the POI visit score.

The visit estimation device may determine probability values for respective POI locations associated with the user device location based on the visit scores. For example, the visit estimation device may determine the probability values based on the visit scores for the respective POI locations and a total visit score associated with the user device. For example, the visit estimation device may convert a set of visit scores for a given user device to a probability value by dividing each visit score by the sum of the visit scores associated with the given user device (e.g., the sum of the visit scores may be the total visit score). For example, the visit score for the user device location for POI 1 may be 7, the visit score for the user device location for POI 2 may be 2, and the visit score for the user device location for POI 3 may be 1. In this example, the total visit score may be 10 (e.g., 7+2+1=10). Therefore, the probability value for the POI 1 may be 0.7 (e.g., 7 divided by 10), the probability value for the POI 2 may be 0.2 (e.g., 2 divided by 10), and the probability value for the POI 3 may be 0.1 (e.g., 1 divided by 10). The visit estimation device may determine POI locations, visit scores, and probability scores for other user device locations in a similar manner as described herein.

Figure 1C:
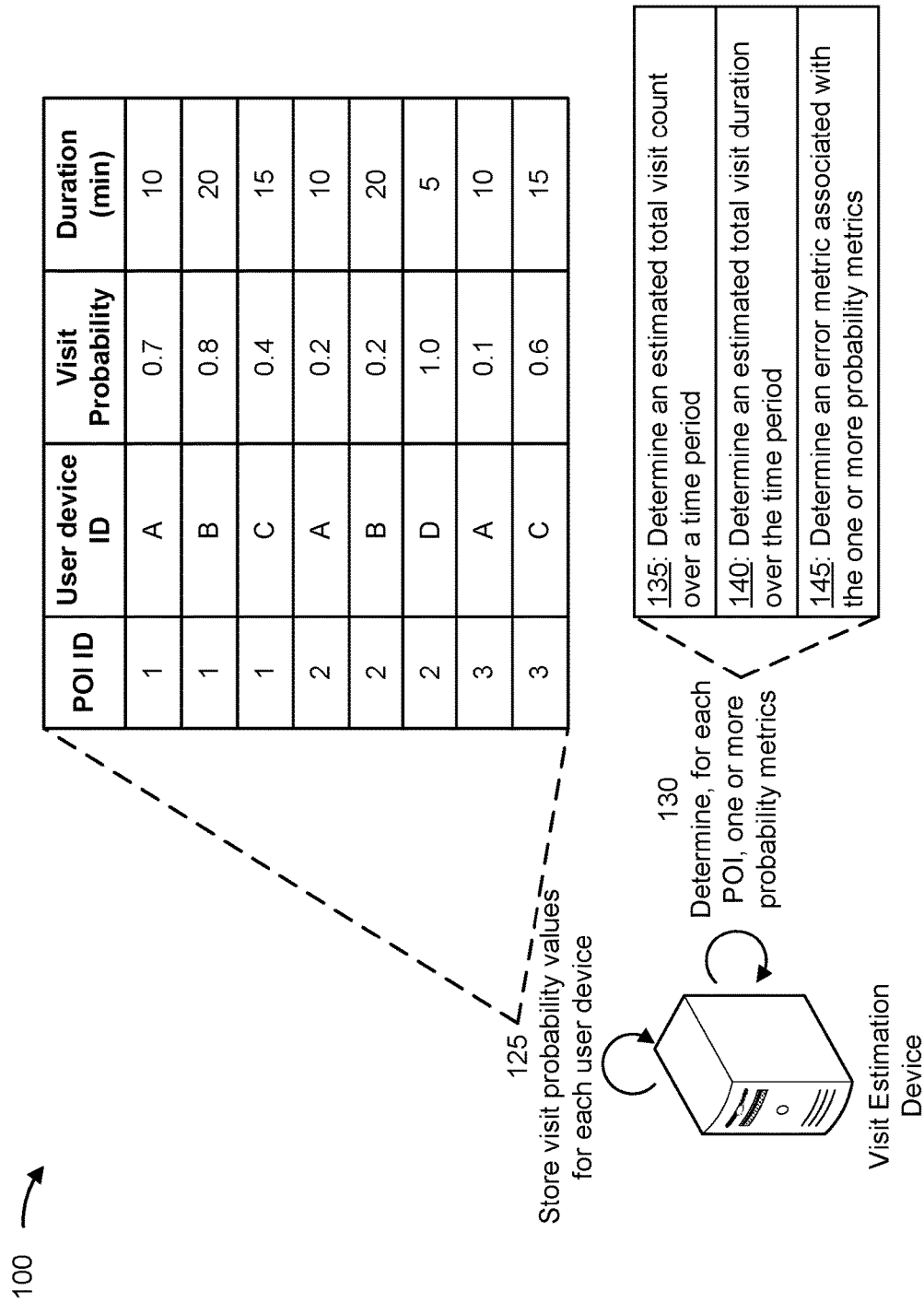

As shown in FIG. 1C, and by reference number 125, the visit estimation device may store visit probability values for each user device that is associated with at least one POI location. In some implementations, the visit estimation device may store a duration associated with each user device location (e.g., indicating an amount of time that the user device was located at the user device location).

For example, as shown in FIG. 1C, the visit estimation device may maintain a table that includes entries corresponding to a POI location, a user device, a visit probability (e.g., a probability value) associated with the user device and the POI location, and a duration, among other examples. For example, as described elsewhere herein, the probability value may indicate a probability that a user associated with a user device visited a given POI location (e.g., based on a probability that the user device was located at the POI location). For example, as the visit estimation device determines POI locations and/or probability values associated with the POI locations for a given user device location, the visit estimation device may create an entry in the table for the POI location and the user device.

For example, the user device location depicted and described in connection with FIG. 1B may be associated with a user device ID "A." The user device location may be associated with a duration of 10 minutes (e.g., as indicated by the location data). As shown in the table, the visit estimation device may create an entry associated with the user device A for the POI 1, the POI 2, and the POI 3 (e.g., the POIs associated with the user device location of the user device A as determined by the visit estimation device). For example, an entry associated with the user device A and the POI 1 may indicate a visit probability of 0.7 and a duration of 10 minutes, an entry associated with the user device A and the POI 2 may indicate a visit probability of 0.2 and a duration of 10 minutes, and an entry associated with the user device A and the POI 3 may indicate a visit probability of 0.1 and a duration of 10 minutes. The visit estimation device may populate the table with entries associated with other user devices and/or other POI locations in a similar manner.

As shown by reference number 130, the visit estimation device may determine one or more probability metrics for each POI location. For example, the visit estimation device may determine one or more probability metrics for respective POI locations from the POI locations indicated by the table. The one or more probability metrics may include an estimated total visit count, an estimated total visit duration, and/or a error metric, among other examples. In other words, the visit estimation device may determine the one or more probability metrics on a POI location basis (e.g., for each POI location), rather than on a user device location basis. This may enable the visit estimation device to generate more insightful visit data for the POI locations because the visit estimation device may utilize a collection of potential visits of a given time period, each potential visit being associated with a different probability, for a given POI location (e.g., rather than selecting a given POI location for each user device location and counting the selected given POI location as the location that the user of the user device visited).

For example, as shown by reference number 135, the visit estimation device may determine an estimated total visit count for a POI location over a time period (e.g., for a given day, week, month, and/or year). The visit estimation device may determine the estimated total visit count based on a sum of one or more probability values, from probability values (e.g., visit probability values) determined by the visit estimation device, that are associated with the POI location. For example, for a given POI location, the visit estimation device may determine an estimated total visit count using an equation (1):

$$E_i = \sum_{j=1}^{n_i} p_{i,j} \qquad (1)$$

where $E_i$ is the estimated total visit count for a POI location i, $n_i$ is the number of potential daily visitors for the POI location i (e.g., a number of user devices associated with the POI location i, such as indicated by the table), and $p_{i,j}$ is the probability of the $j^{th}$ user device being associated with the POI location i. For example, a probability value may indicate that a given user device has a 70% probability of being associated with the POI location i. In some implementations, the visit estimation device may normalize the probability values such that a probability value indicating a 100% likelihood is equal to a value of 1. This may enable the visit estimation device to sum the normalized probability values to determine an estimated total visit for a POI location i. As an example, for the POI 1 in FIG. 1C, the visit estimation device may sum the probability values of 0.7, 0.8, and 0.4 to obtain an estimated visit count of 1.9 for the POI 1. Similarly, for the POI 2, the visit estimation device may sum the probability values of 0.2, 0.2, and 1.0 to obtain an estimated visit count of 1.4 for the POI 2. The visit estimation device may determine and/or calculate an estimated visit count for all POI locations indicated by the table in a similar manner.

As shown by reference number 140, the visit estimation device may determine, for each POI location, an estimated total visit duration over the time period. For example, the visit estimation device may determine a metric indicating an estimated total time that users spent at a given POI location over a time period. In some implementations, the visit estimation device may determine an average estimated total time that users spent at a given POI location by averaging estimated visit durations for each user device associated with the given POI location. The visit estimation device may determine the estimated visit duration by multiplying the probability value by the duration for each user device. As an example, for the POI 1 and the user device A, the estimated visit duration may be 7 minutes (e.g., 0.7 multiplied by 10 minutes). In some implementations, the visit estimation device may sum the estimated visit durations associated with the POI location to determine the estimated total visit duration over the time period. For example, the visit estimation device may determine an estimated total visit duration using an equation (2):

$$D_i = \sum_{j=1}^{n_i} (p_{i,j} \times d_j) \quad (2)$$

where $D_i$ is the estimated total visit duration for the POI location i, and $d_j$ is the duration associated with the $j^{th}$ user device. The visit estimation device may determine an estimated total visit duration for each POI location indicated by the table in a similar manner.

As shown by reference number 145, the visit estimation device may determine a error metric associated with the one or more probability metrics. The error metric may be an error estimation for the estimated total visit count. For example, the visit estimation device may determine a error metric of the estimated total visit counts for each respective POI location. In some implementations, the visit estimation device may determine the error metric for a POI location, from the one or more POI locations, based on a coefficient of variation associated with one or more probability values, from the probability values, associated with the POI location. As another example, the error metric may include a standard deviation of a distribution of one or more probability values, from the probability values, associated with the POI location. In some implementations, the error metric may include a ratio of the standard deviation of the estimated total visit count to an expected value of the estimated total visit count. For example, the visit estimation device may determine the error metric using an equation (3):

$$\sigma_i = \sqrt{\sum_{j=1}^{n_i} p_{i,j} \times (1 - p_{i,j})} \quad (3)$$

For example, when the visits of the users are independent of each other, the error metric may be determined by a generalization of a binomial distribution of the estimated total visit count. In the standard binomial distribution, the standard deviation of a large number of trials (N) of an event occurring with the same probability p is given by the square root of $N*p*(1-p)$. If the probability is different for each event, then the binomial distribution must be generalized. This generalization of the binomial distribution is given in equation (3) based on the probability values associated with respective user devices and a given POI location. The visit estimation device may determine one or more error metrics for each POI location in a similar manner.

As shown in FIG. 1D, the visit estimation device may perform one or more actions associated with (or based on) the one or more probability metrics associated with respective POI locations. For example, as shown by reference number 150, the visit estimation device may store the one or more probability metrics. For example, the visit estimation device may maintain a database or other data structure that is associated with visit estimations for the POI locations. As another example, and as shown by reference number 155, the visit estimation device may transmit, and the client device may receive, an indication of the one or more probability metrics. For example, the client device may request or subscribe to visit count estimations associated with one or more POI locations. The visit estimation device may transmit, to the client device, one or more probability metrics associated with respective POI locations from the one or more POI locations.

As a result, the system is enabled to improve an accuracy of visit count estimations for POI locations that are based on location data of user devices. For example, by using a probabilistic approach to estimating visit counts at POI locations, the system mitigates a risk of bias toward POI locations that are associated with larger geographic footprints than nearby POI locations. The system also provides one or more error metrics so that additional analysis performed on the client device can weight or filter based on an uncertainty to provide better estimates of visit counts for an aggregate of similar POI locations. This conserves network resources, processing resources, computing resources, and/or memory resources, among other examples, that would have otherwise been used analyzing and/or making determinations based on visit count data that is inaccurate (e.g., because of a bias toward POI locations with larger geographic footprints).

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
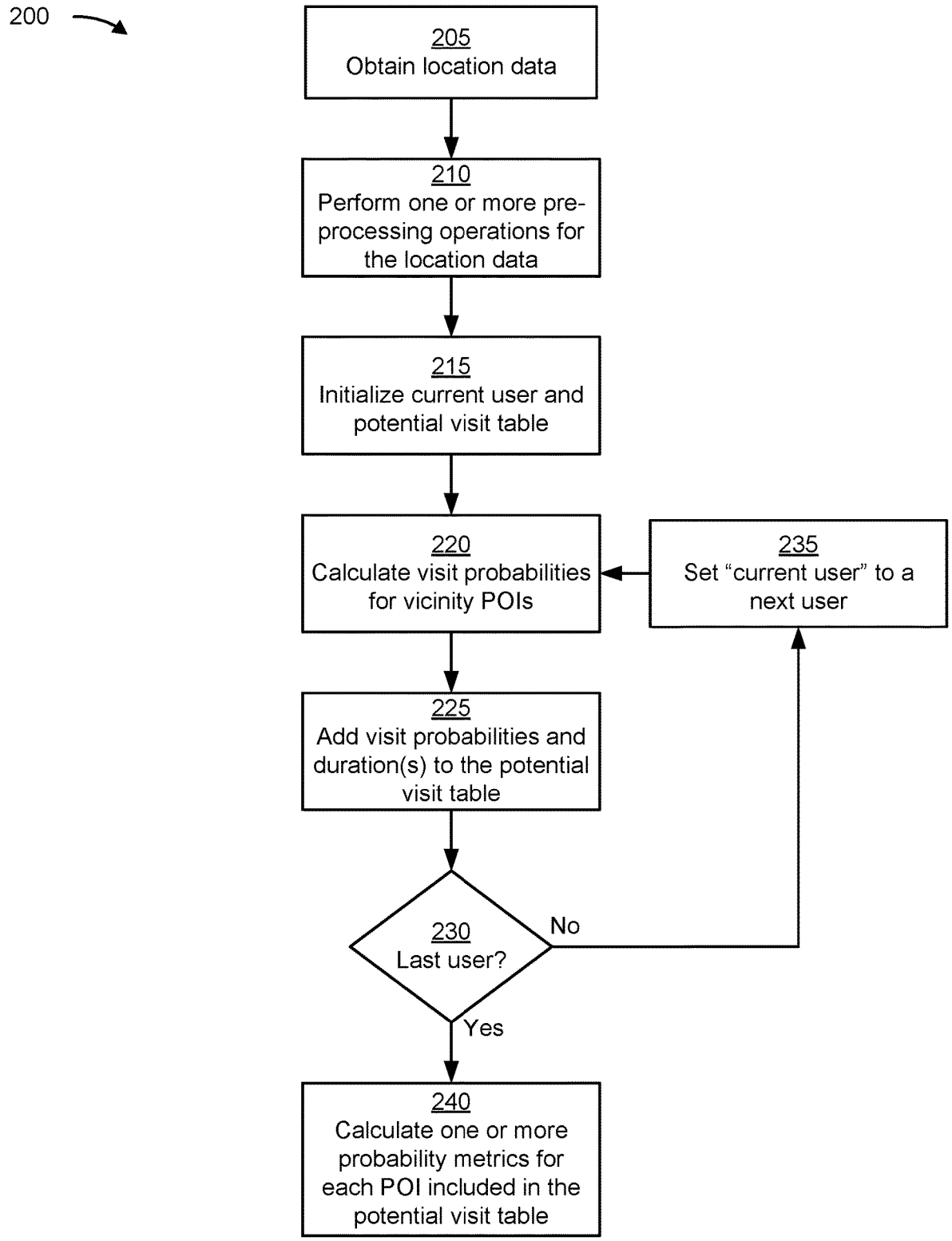
FIG. 2 is a diagram of an example process associated with probabilistic POI visit count estimation.

FIG. 2 is a diagram of an example process 200 associated with probabilistic POI visit count estimation. As shown in FIG. 2, the process 200 may be performed by the visit estimation device, the location collection device, and/or the client device.

As shown in FIG. 2, the process 200 may include obtaining location data (block 205). Location data may consist of the user device location, the user device location uncertainty, and a set of POI location polygons or multi-polygons. For example, the visit estimation device may obtain location data. In a similar manner as described above in connection with FIGS. 1A-1D, the location data may include geographic coordinate locations of respective user devices. As described herein, a user device may be associated with a user. The user device location data may be based on triangulation data.

The process 200 may include performing one or more pre-processing operations for the location data (block 210). For example, the visit estimation device may perform the one or more pre-processing operations for the location data. In some implementations, the one or more pre-processing operations may include removing user devices associated with employees of a POI location and/or user devices of users who reside or live near a POI location. For example, if a quantity of occurrences that a given user device is determined to be associated with a given POI location over a time period satisfies a threshold, then the visit estimation device may determine that the user device is associated with an employee or a resident. Therefore, the visit estimation device may remove the given user device from the location data.

The process 200 may include initializing a current user and a potential visit table (block 215). For example, the visit estimation device may initialize a current user and a potential visit table. For example, the current user may be associated with a user device indicated by the location data (e.g., after removing the user devices associated with employees or a residents). The potential visit table may be similar to the table depicted in FIG. 1C. The process 200 may include calculating visit probabilities for vicinity POIs (e.g., POI locations) (block 220). For example, the visit estimation device may calculate visit probabilities for vicinity POIs. The vicinity POI locations may be POI locations located nearby a user device location of the current user. For example, the vicinity POI locations may be POI locations having a geographic footprint that overlaps with an uncertainty range of the user device location, as described in more detail elsewhere herein. The visit probabilities may be the probability values described elsewhere herein.

The process 200 may include adding the visit probabilities and durations to the potential visit table (block 225). For example, the visit estimation device may add the visit probabilities and durations to the potential visit table. For example, for each visit probability, the visit estimation device may create an entry in the potential visit table associated with the user (e.g., associated with the user device) and a POI location. The visit estimation device may include an indication of a user device identifier, a POI location identifier, the visit probability, and a duration (e.g., for which the user device was located at the user device location as indicated by the location data).

The process 200 may include determining whether the current user is a last user over a given time interval (block 230). For example, the visit estimation device may determine whether the current is a last user indicated by the date and time being the latest date and time of user location data. If the current user is not the last user (block 230—No), then the process 200 may include setting the current user to a next user indicated by the location data (block 235). The process 200 may continue to perform operations associated with blocks 220, 225, 230, and/or 235 (e.g., in a similar manner as described elsewhere herein) until the current user is a last user.

If the current user is the last user (block 230—Yes), then the process 200 may include calculating one or more probability metrics for each POI included in the potential visit table (block 240). For example, the visit estimation device may calculate the one or more probability metrics for each POI included in the potential visit table. The visit estimation device may calculate the one or more probability metrics in a similar manner as described in more detail elsewhere herein, such as in connection with FIGS. 1A-1D. For example, the one or more probability metrics may include an estimated total visit count, an estimated total visit duration, and/or one or more error metrics, among other examples.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

Figure 3:
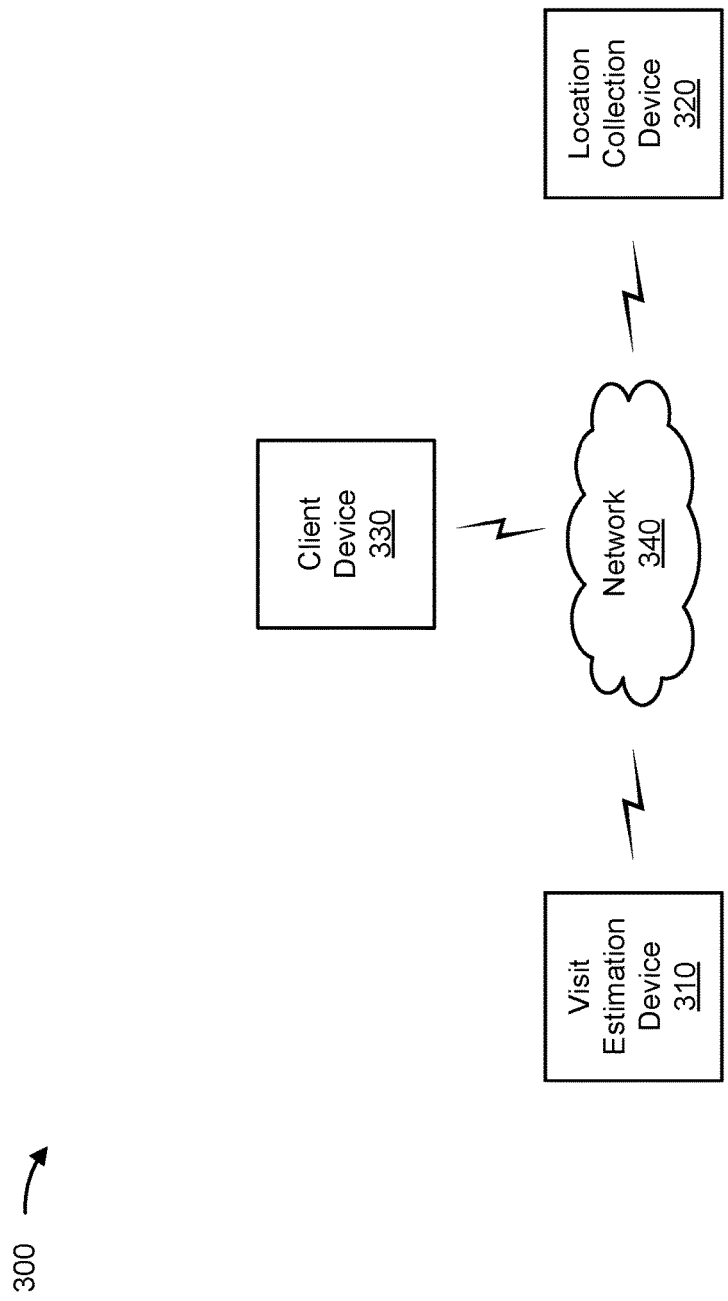
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a visit estimation device 310, a location collection device 320, a client device 330, and a network 340. Devices of environment 300 may interconnect via wired connections, wireless connections, or a combination of wired and wireless connections.

The visit estimation device 310 may include one or more devices capable of receiving, generating, storing, processing, providing, and/or routing information associated with probabilistic POI visit count estimation, as described elsewhere herein. The visit estimation device 310 may include a communication device and/or a computing device. For example, the visit estimation device 310 may include a server, such as an application server, a client server, a web server, a database server, a host server, a proxy server, a virtual server (e.g., executing on computing hardware), or a server in a cloud computing system. In some implementations, the visit estimation device 310 may include computing hardware used in a cloud computing environment.

The location collection device 320 may include one or more devices capable of receiving, generating, storing, processing, providing, and/or routing information associated with collecting location data associated with probabilistic POI visit count estimation, as described elsewhere herein. The location collection device 320 may include a communication device and/or a computing device. For example, the location collection device 320 may include a server, such as an application server, a client server, a web server, a database server, a host server, a proxy server, a virtual server (e.g., executing on computing hardware), or a server in a cloud computing system. In some implementations, the location collection device 320 may include computing hardware used in a cloud computing environment.

The client device 330 may include one or more devices capable of receiving, generating, storing, processing, and/or providing information associated with probabilistic POI visit count estimation, as described elsewhere herein. The client device 330 may include a communication device and/or a computing device. For example, the client device 330 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 340 may include one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
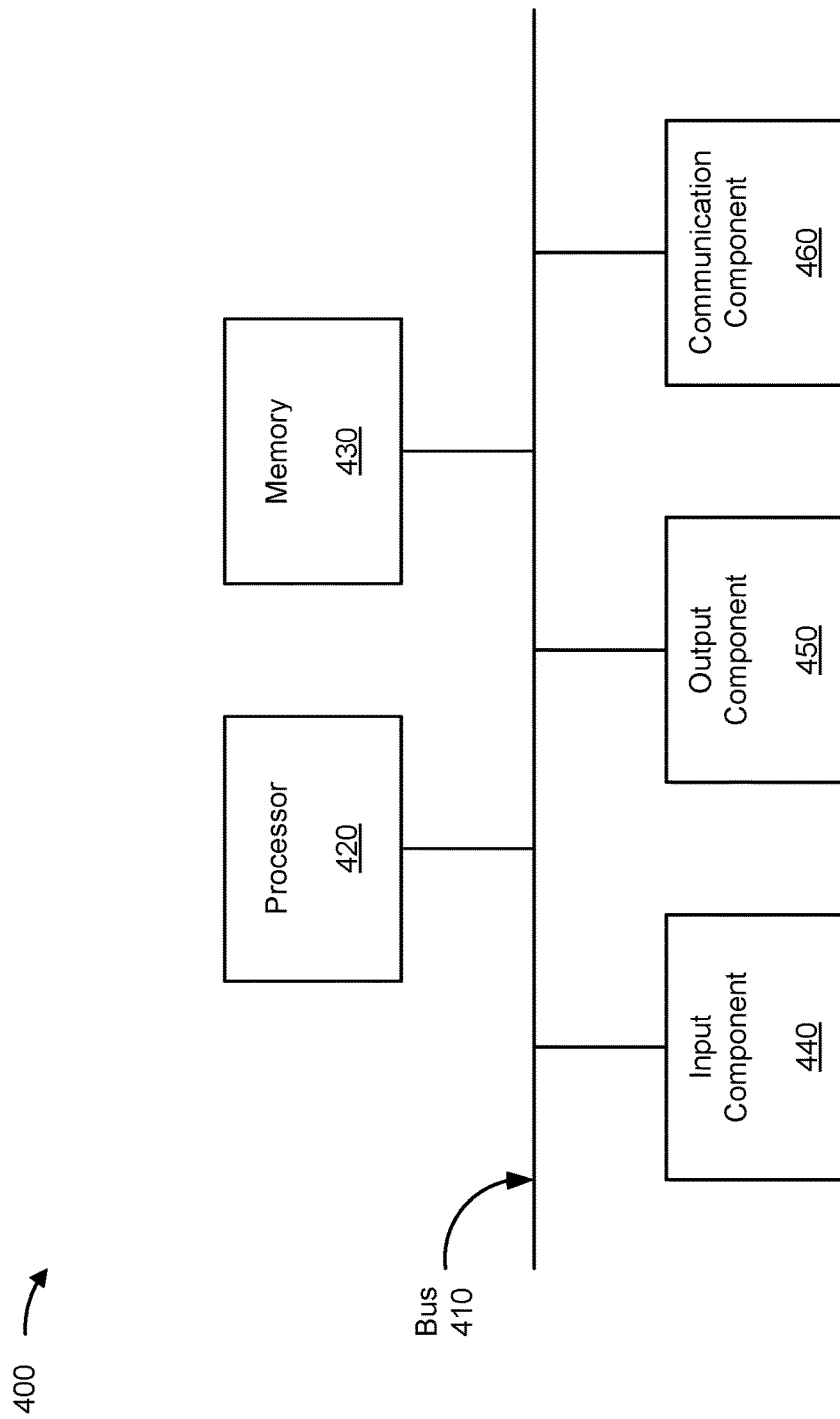
FIG. 4 is a diagram of example components of a device associated with probabilistic POI visit estimation.

FIG. 4 is a diagram of example components of a device 400 associated with probabilistic POI visit estimation. The device 400 may correspond to the visit estimation device 310, the location collection device 320, and/or the client device 330. In some implementations, the visit estimation device 310, the location collection device 320, and/or the client device 330 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hard-wired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with probabilistic POI visit count estimation. In some implementations, one or more process blocks of FIG. 5 may be performed by a visit estimation device (e.g., visit estimation device 310). In some implementations, one or more process blocks of FIG. 5 may be performed by another device or a group of devices separate from or including the visit estimation device, such as the location collection device 320 and/or the client device 330. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include obtaining location data associated with one or more user devices (block 510). For example, the visit estimation device may obtain location data associated with one or more user devices, wherein the location data indicates, for the one or more user devices, respective geographic locations, an uncertainty (or uncertainty range) of the respective geographic locations, and respective durations, as described above. In some implementations, the location data indicates, for the one or more user devices, respective geographic locations and respective durations. The location data may be based on triangulation data.

As further shown in FIG. 5, process 500 may include determining, based on the location data, one or more POI locations associated with respective user devices from the one or more user devices (block 520). For example, the visit estimation device may determine, based on the location data, one or more POI locations associated with respective user devices from the one or more user devices, as described above.

As further shown in FIG. 5, process 500 may include determining, for each user device from the one or more user devices, probability values for respective POI locations from the one or more POI locations (block 530). For example, the visit estimation device may determine, for each user device from the one or more user devices, probability values for respective POI locations from the one or more POI locations, as described above. In some implementations, the probability values indicate likelihoods of user visits at the respective POI locations. In some implementations, the probability values are based on uncertainty ranges associated with the respective geographic locations and geographic footprints associated with the respective POI locations.

For example, determining the probability values may comprise determining, for a user device from the one or more user devices, visit scores for the respective POI locations based on a geographic location associated with the user device and geographic footprints associated with the respective POI locations, and determining the probability values based on the visit scores for the respective POI locations and a total visit score associated with the user device. In some implementations, the visit scores for the respective POI locations are based on a geographic overlap of an uncertainty range associated with the geographic location and the geographic footprints associated with the respective POI locations. The visit scores for the respective POI locations may be based on a location probability distribution over an uncertainty range associated with the geographic location and the geographic footprints associated with the respective POI locations.

As further shown in FIG. 5, process 500 may include determining one or more probability metrics for the respective POI locations, from the one or more POI locations, associated with user visits to the respective POI locations (block 540). For example, the visit estimation device may determine one or more probability metrics for the respective POI locations, from the one or more POI locations, associated with user visits to the respective POI locations, as described above. In some implementations, the one or more probability metrics include at least one of an estimated total visit count, an estimated total visit duration, or a error metric.

As an example, the one or more probability metrics may include an estimated total visit count, and determining the one or more probability metrics may include determining, for a POI location from the one or more POI locations, the estimated total visit count based on a sum of one or more probability values, from the probability values for the respective POI locations, that are associated with the POI location.

As another example, the one or more probability metrics may include an estimated total visit duration, and determining the one or more probability metrics may include identifying, for a POI location from the one or more POI locations, one or more durations, from the respective durations, associated with the POI location; determining estimated visit durations based on the one or more durations and respective probability values, from the probability values, associated with the POI location and associated with the respective durations; and determining the estimated total visit duration based on a sum of the estimated visit durations.

As another example, the one or more probability metrics may include a error metric, and determining the one or more probability metrics may include determining the error metric for a POI location, from the one or more POI locations, based on a coefficient of variation associated with one or more probability values, from the probability values, associated with the POI location.

As another example, the one or more probability metrics may include a error metric, and the error metric, for a POI location from the one or more POI locations, may include a standard deviation of a distribution of one or more probability values, from the probability values, associated with the POI location.

As further shown in FIG. 5, process 500 may optionally include performing an action based on the one or more probability metrics (block 550). For example, the visit estimation device may store the one or more probability metrics, as described above. As another example, the visit estimation device may transmit, to another device, an indication of the one or more probability metrics.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    obtaining, by a device, location data associated with one or more user devices,
        wherein the location data indicates, for the one or more user devices, respective geographic locations and respective durations, and
    determining, by the device and based on the location data, one or more point of interest (POI) locations associated with respective user devices from the one or more user devices;
    determining, by the device and for each user device from the one or more user devices, probability values for respective POI locations from the one or more POI locations,
        wherein the probability values indicate likelihoods of user visits at the respective POI locations, and
        wherein the probability values are based on uncertainty ranges associated with the respective geographic locations and geographic footprints associated with the respective POI locations;
    determining, by the device, one or more probability metrics for the respective POI locations associated with user visits to the respective POI locations,
        wherein the one or more probability metrics include an estimated total visit count, and
        wherein determining the one or more probability metrics comprises:
            identifying, for a POI location from the one or more POI locations, one or more durations, from the respective durations, associated with the POI location;
            determining estimated visit durations based on the one or more durations and respective probability values, from the probability values, associated with the POI location and associated with the respective durations; and
            determining an estimated total visit duration based on a sum of the estimated visit durations; and
    performing, by the device, an action based on the one or more probability metrics.

2. The method of claim 1, wherein determining the probability values comprises:
    determining, for a user device from the one or more user devices, visit scores for the respective POI locations based on a geographic location and an uncertainty range associated with the user device and geographic footprints associated with the respective POI locations; and
    determining the probability values based on the visit scores for the respective POI locations and a total visit score associated with the user device.

3. The method of claim 2, wherein the visit scores for the respective POI locations are based on a geographic overlap of an uncertainty range associated with the geographic location and the geographic footprints associated with the respective POI locations.

4. The method of claim 2, wherein the visit scores for the respective POI locations are based on a location probability distribution over an uncertainty range associated with the geographic location and the geographic footprints associated with the respective POI locations.

5. The method of claim 1, wherein the one or more probability metrics include at least one of:
    the estimated total visit count,
    the estimated total visit duration, or
    an error metric.

6. The method of claim 1, wherein the one or more probability metrics include an estimated total visit count, and wherein determining the one or more probability metrics comprises:
    determining, for a POI location from the one or more POI locations, the estimated total visit count based on a sum of one or more probability values, from the probability values for the respective POI locations, that are associated with the POI location.

7. The method of claim 1, wherein the one or more probability metrics include a error metric, and wherein determining the one or more probability metrics comprises:
    determining the error metric for a POI location, from the one or more POI locations, based on a coefficient of variation associated with one or more probability values, from the probability values, associated with the POI location.

8. The method of claim 1, wherein the one or more probability metrics include an error metric, and wherein the error metric, for a POI location from the one or more POI locations, includes a standard deviation of a distribution of one or more probability values, from the probability values, associated with the POI location.

9. The method of claim 1, wherein the location data is based on triangulation data.

10. The method of claim 1, wherein the location data includes one or more parameters associated with communications between the one or more user devices and one or more base stations.

11. A device, comprising:
    one or more processors configured to:
        obtain location data associated with one or more user devices,
            wherein the location data indicates, for the one or more user devices, respective geographic locations and respective durations, and
        determine, based on the location data, one or more point of interest (POI) locations associated with respective user devices from the one or more user devices;
        determine, for each user device from the one or more user devices, probability values for respective POI locations from the one or more POI locations,
            wherein the probability values indicate a likelihood of a user visit at the respective POI locations;
        determine one or more probability metrics for the respective POI locations, from the one or more POI locations, associated with user visits to the respective POI locations,
            wherein the one or more probability metrics include an estimated total visit count, and
            wherein determining the one or more probability metrics comprises:

identifying, for a POI location from the one or more POI locations, one or more durations, from the respective durations, associated with the POI location;

determining estimated visit durations based on the one or more durations and respective probability values, from the probability values, associated with the POI location and associated with the respective durations; and determining an estimated total visit duration based on a sum of the estimated visit durations; and perform an action based on the one or more probability metrics.

12. The device of claim 11, wherein the probability values are based on an uncertainty range associated with the respective geographic locations and a geographic footprint associated with the respective POI locations.

13. The device of claim 11, wherein the one or more processors, to determine the probability values, are configured to:

determine, for a user device from the one or more user devices, a visit score for the respective POI locations based on a geographic location and an uncertainty range associated with the user device and a geographic footprint associated with the respective POI locations; and determine the probability values based on the visit score for the respective POI locations and a total visit score associated with the user device.

14. The device of claim 11, wherein the one or more probability metrics include at least one of:

the estimated total visit count, the estimated total visit duration, or an error metric.

15. The device of claim 11, wherein the one or more probability metrics include an error metric, and wherein the error metric, for a POI location from the one or more POI locations, includes a generalized binomial distribution of one or more probability values, from the probability values, associated with the POI location.

16. The device of claim 11, wherein the location data includes one or more parameters associated with communications between the one or more user devices and one or more base stations.

17. A non-transitory computer-readable medium storing a set of instructions, the set of instructions comprising:

one or more instructions that, when executed by one or more processors of a device, cause the device to:

obtain location data associated with one or more user devices, wherein the location data indicates, for the one or more user devices, respective geographic locations and respective durations;

determine, based on the location data, one or more point of interest (POI) locations associated with respective user devices from the one or more user devices;

determine, for each user device from the one or more user devices, probability values for respective POI locations from the one or more POI locations, wherein the probability values indicate likelihoods of user visits at the respective POI locations, and wherein the probability values are based on uncertainty ranges associated with the respective geographic locations and geographic footprints associated with the respective POI locations;

determine one or more probability metrics for the respective POI locations associated with user visits to the respective POI locations, wherein the one or more probability metrics include an estimated total visit count, and wherein determining the one or more probability metrics comprises:

identifying, for a POI location from the one or more POI locations, one or more durations, from the respective durations, associated with the POI location;

determining estimated visit durations based on the one or more durations and respective probability values, from the probability values, associated with the POI location and associated with the respective durations; and determining an estimated total visit duration based on a sum of the estimated visit durations; and store the one or more probability metrics.

18. The non-transitory computer-readable medium of claim 17, wherein the one or more instructions, that cause the device to determine the probability values, cause the device to:

determine, for a user device from the one or more user devices, visit scores for the respective POI locations based on a geographic location associated with the user device and the geographic footprints associated with the respective POI locations; and determine the probability values based on the visit score for the respective POI locations and a total visit score associated with the user device.

19. The non-transitory computer-readable medium of claim 18, wherein the visit scores for the respective POI locations are based on a geographic overlap between an uncertainty range associated with the geographic location and the geographic footprints associated with the respective POI locations.

20. The non-transitory computer-readable medium of claim 18, wherein the visit scores for the respective POI locations are based on a location probability distribution over an uncertainty range associated with the geographic location and the geographic footprints associated with the respective POI locations.

* * * * *